(12) United States Patent
Götze et al.

(10) Patent No.: US 11,698,994 B2
(45) Date of Patent: Jul. 11, 2023

(54) METHOD FOR A FIRST START-UP OPERATION OF A SECURE ELEMENT WHICH IS NOT FULLY CUSTOMIZED

(71) Applicant: GIESECKE+DEVRIENT MOBILE SECURITY GMBH, Munich (DE)

(72) Inventors: Frank Götze, Munich (DE); Claus Dietze, Obersöchering (DE); Jan Eichholz, Munich (DE)

(73) Assignee: GIESECKE+DEVREINT MOBILE SECURITY GMBH, Munich (DE)

( * ) Notice: Subject to any disclaimer, the term of this patent is extended or adjusted under 35 U.S.C. 154(b) by 22 days.

(21) Appl. No.: 16/098,287

(22) PCT Filed: Apr. 28, 2017

(86) PCT No.: PCT/EP2017/000537
§ 371 (c)(1),
(2) Date: Nov. 1, 2018

(87) PCT Pub. No.: WO2017/190830
PCT Pub. Date: Nov. 9, 2017

(65) Prior Publication Data
US 2019/0147193 A1 May 16, 2019

(30) Foreign Application Priority Data

May 2, 2016 (DE) ............... 10 2016 005 419.0

(51) Int. Cl.
| | | |
|---|---|---|
| *G06F 9/00* | (2006.01) | |
| *G06F 15/177* | (2006.01) | |
| *G06F 21/77* | (2013.01) | |
| *H04W 4/50* | (2018.01) | |

(Continued)

(52) U.S. Cl.
CPC ............ *G06F 21/77* (2013.01); *G06F 8/61* (2013.01); *G06F 9/445* (2013.01); *G06F 9/4416* (2013.01);
(Continued)

(58) Field of Classification Search
CPC .................................................. G06F 15/177
See application file for complete search history.

(56) References Cited

U.S. PATENT DOCUMENTS

2011/0254687 A1* 10/2011 Arponen ........... H04M 1/72525
340/540
2012/0289193 A1* 11/2012 Bergenwall ......... H04W 12/086
455/410

(Continued)

OTHER PUBLICATIONS

"Reprogrammable SIMs: Technology, Evolution and Implications Final Report," CSMG, Sep. 25, 2012, 95 Pages.

(Continued)

*Primary Examiner* — Nitin C Patel
(74) *Attorney, Agent, or Firm* — Workman Nydegger

(57) ABSTRACT

A method is for a first-time startup of a not fully personalized secure element, which serves for the use of services of a mobile communication network, in a mobile terminal. In the method, the secure element is started and requested to transmit a status message. The secure element transmits a status message in which it is stated whether the secure element: S1) contains only a bootloader but as yet no firmware image for the secure element; S2) contains a firmware image for the secure element but is not yet fully personalized; or S3) is fully personalized. The secure element is accepted in the cases S1), S2) and S3) and rejected in other cases. In the case S1), a download for a firmware image of the secure element is initiated for a first-time startup.

20 Claims, 1 Drawing Sheet

(51) Int. Cl.
*H04W 4/60* (2018.01)
*G06F 9/4401* (2018.01)
*G06F 21/57* (2013.01)
*G06F 21/72* (2013.01)
*G06F 8/61* (2018.01)
*H04L 9/40* (2022.01)
*G06F 9/445* (2018.01)
*H04W 12/30* (2021.01)
*H04B 1/3816* (2015.01)

(52) U.S. Cl.
CPC ........ *G06F 9/44505* (2013.01); *G06F 21/572* (2013.01); *G06F 21/575* (2013.01); *G06F 21/72* (2013.01); *H04B 1/3816* (2013.01); *H04L 63/0853* (2013.01); *H04W 4/50* (2018.02); *H04W 4/60* (2018.02); *H04W 12/35* (2021.01); *G06F 8/63* (2013.01); *G06F 2221/2149* (2013.01); *G06F 2221/2153* (2013.01)

(56) References Cited

U.S. PATENT DOCUMENTS

| | | |
|---|---|---|
| 2013/0295997 A1 | 11/2013 | Sen et al. |
| 2014/0137102 A1 | 5/2014 | Chan et al. |
| 2014/0194103 A1 | 7/2014 | O'Donnell et al. |
| 2014/0220952 A1 | 8/2014 | Holtmanns et al. |
| 2015/0134958 A1 | 5/2015 | Merrien et al. |
| 2015/0312698 A1 | 10/2015 | Schell et al. |
| 2015/0382178 A1 | 12/2015 | Park et al. |
| 2016/0012451 A1* | 1/2016 | Shanmugam ........... H04L 41/22 705/304 |

OTHER PUBLICATIONS

"Re-scoping of the Draft eUICC Requirements Specification," SCP REQ, ETSI TC SCP REQ #41, Feb. 6, 2013, 19 Pages.
"Smart Cards; Embedded UICC; Technical Specification (Release 13)," ETSI TS 103 384, Version 0.22.0, Apr. 2016, 35 Pages.
German Search Report from DE Application No. 102016005419.0, dated Jan. 31, 2017.
International Preliminary Report on Patentability from PCT Application No. PCT/EP2017/000537, dated Nov. 6, 2018.
International Search Report and Written Opinion from PCT Application No. PCT/EP2017/000537, dated Jun. 22, 2017.
"Annex E (Normative): Coding of USIM Specific Data," 3rd Generation Partnership Project; Technical Specification Group Terminals; Characteristics of the USIM Application (3G TS 31.102 version 1.0.0), Oct. 1999, pp. 86-91.

* cited by examiner

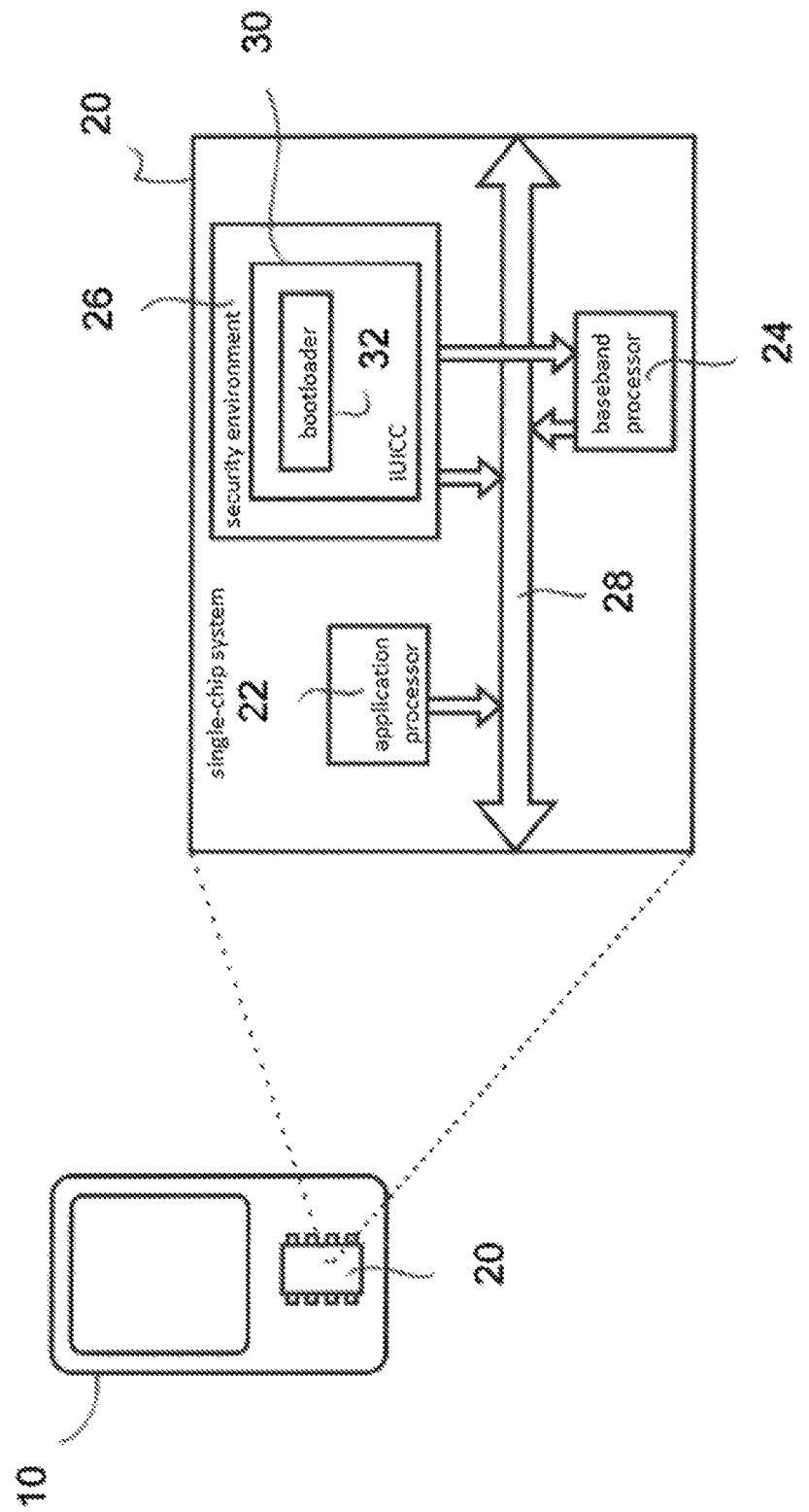

METHOD FOR A FIRST START-UP OPERATION OF A SECURE ELEMENT WHICH IS NOT FULLY CUSTOMIZED

BACKGROUND

The invention relates to universal integrated circuit cards (UICCs) in general, and in particular relates to methods for the first-time startup of a not fully personalized secure element, in particular in the form of a UICC or an integrated UICC (iUICC).

Current mobile terminals are usually adapted to receive and operate removable universal integrated circuit cards (UICCs). A fully personalized UICC allows the mobile terminal to access services, which are made available by operators of mobile networks (mobile network operator, MNO). The UICCs are presently formed as a card or as an embedded module (embedded UICC, eUICC) in different form factors. In particular for embedded UICCs, it is necessary to be able to maintain data and parts of the operating system via corresponding subscription management services, i.e. to be able to create, activate, update and delete data and program parts.

In new concepts for mobile terminals, it has been considered to no longer configure the UICC as a separate element, but to integrate it in a single-chip system of the terminal such that it is present in the form of an integrated UICC (iUICC) loaded into a security environment of the single-chip system. In such a case, it is desirable to be able to load into the security environment of the mobile terminal and personalize the entire operating system, hereinafter also referred to as firmware image, via a subscription management service.

At present, a bootloader is provided in the UICC for this purpose, which is normally made available by the chip manufacturer itself. The bootloader serves to load the image produced by the UICC, namely the firmware image specified above, onto the UICC and install it there. The bootloaders are constituted in such a manner that certain command sequences must be strictly observed and certain security conditions must be fulfilled. When an attempt is made to start up in a mobile terminal current UICCs or eUICCs that contain only a bootloader, this leads to a rejection of the UICC by the baseband processor and the output of a corresponding error message to the user. For a UICC supplied with a bootloader only returns a different answer-to-reset (ATR) during the startup than a fully personalized UICC. Further regular UICC commands are then ignored by the bootloader. The baseband processor turns off the UICC as a result, so that the latter is no longer accessible for subscription management commands and the download of a firmware image is thus no longer possible.

Further, mobile terminals and, in particular, smart phones are frequently subsidized by the operator of a mobile network and, for example, financed over a contract term of one to two years. During this contract term, it is sometimes intended for a customer to only be able to use the device with a specific SIM card, in a specific mobile communication network or with other restrictions. However, the methods currently employed for this purpose are not suitable for integrated UICCs. It is to be assumed here that mobile terminals are distributed in this case with a generic bootloader which allows the loading of iUICCs of various network operators.

SUMMARY

Proceeding from this, the invention is based on the object of avoiding the disadvantages of the prior art. In particular, a method is to be stated which permits a successful first-time startup of a not fully personalized secure element.

The invention makes available a method for the first-time startup of a not fully personalized secure element in a mobile terminal, wherein the secure element serves for the use of services of a mobile communication network. In the method
the secure element is started and requested to transmit a status message,
the secure element transmits a status message in which it is stated whether the secure element
S1) contains only a bootloader but as yet no firmware image for the secure element,
S2) contains a firmware image for the secure element, but is not yet fully personalized, or
S3) is fully personalized,
the secure element is accepted in the cases S1), S2) and S3) and rejected in other cases, and
in the case S1) a download for a firmware image of the secure element is initiated for the first-time startup.

The secure element is advantageously configured as a universal integrated circuit card (UICC), or is configured as an integrated UICC (iUICC), which is loaded into a security environment of the mobile terminal. For this purpose, the mobile terminal advantageously contains a single-chip system having a security environment, for example in the form of a secure processor, into which the iUICC is loaded.

In an advantageous method implementation, in the case S2) a subscription is carried out with a mobile communication network provider and/or in the case S3) a SIM initialization is carried out.

The invention also includes a method for the first-time startup of a secure element not yet containing a firmware image in a mobile terminal, wherein the secure element serves for the use of services of a mobile communication network. In the method
the secure element is started and requested to transmit a status message and to execute commands,
in response to the request, the secure element transmits an expected status message and positively acknowledges the execution of the commands in order to ensure that the secure element is accepted upon the first-time startup, and
a download for a firmware image of the secure element is initiated for the first-time startup.

This procedure is particularly well suited when the method described further above for the first-time startup of a not fully personalized secure element does not lead to success, for example since the baseband processor of the mobile terminal is not adapted to receive the described status messages.

Of course, it is also possible and often even particularly advantageous to combine the two specified procedures with one another. This applies in particular when it is not known in advance whether the baseband processor of the mobile terminal is adapted to receive the described status messages or not. In this case, in particular, a status message of the type specified can be transmitted first and, in the event of failure, recourse can be taken to the procedure specified second.

Various combination possibilities can be considered for the specific implementation, for example, after a non-accepted status message, the secure element can be requested again at a short time interval to transmit a status message and can conclude from the short time interval of the two requests that the baseband processor of the mobile terminal is not adapted to receive such status messages, and can respond to the renewed request in the alternatively specified manner by simulation of the response of an already fully personalized secure element.

In a combined method for the first-time startup of a secure element not yet containing a firmware image in a mobile terminal, wherein the secure element serves for the use of services of a mobile communication network, is then provided that the secure element is started and requested to transmit a status message, the secure element, in response to a first request, transmits a status message in which it is stated that the secure element S1) contains only a bootloader, but as yet no firmware image for the secure element, and if the status message is not accepted, the secure element, in response to a renewed request, transmits an expected status message and, in response to a request to execute commands, positively acknowledges the execution of the commands, in order to ensure that the secure element is accepted upon the first-time startup, and a download for a firmware image of the secure element is initiated for the first-time startup.

In this case, the secure element is also advantageously configured as a universal integrated circuit card (UICC), or is configured as an integrated UICC (iUICC) loaded into a security environment of the mobile terminal. For this purpose, the mobile terminal advantageously contains a single-chip system having a security environment, for example in the form of a secure processor, into which the iUICC is loaded.

A further aim is, in the present case, to allow a network binding of the mobile terminal for a certain period of time also in the case of an integrated UICC (iUICC) loaded into a security environment of a mobile terminal.

In order to reach this further aim, in order to ensure the network binding of an iUICC loaded into a security environment of a mobile terminal, a start UICC is loaded into the security environment, which start UICC contains no subscription data, but contains rules for selecting loadable subscription data, and which cannot be removed from the security environment in an unauthorized manner.

The start UICC can in particular be loaded into the security environment via a generic bootloader with which the mobile terminal is initially equipped, for example by the OEM of the smart phone.

An authorization for removing the start UICC can be effected, for example, via the input of a code. Advantageously, the rules for selecting the loadable subscription data can likewise be changed only in an authorized manner. This can be effected, for example, by a server after the desired network binding period has elapsed.

Further, the generic bootloader is advantageously locked in such a manner that the start UICC cannot be removed and no additional UICC can be loaded into the security environment. Advantageously, the generic bootloader can likewise be unlocked only in an authorized manner.

During a later application of subscription data into the start UICC, the latter checks whether the subscription data are compliant with the specified selection rules. If this is the case, the subscription is carried out and is otherwise rejected by the start UICC.

Alternatively, the start UICC can also be configured to contain a complete profile including subscription data. In this case, the generic bootloader is configured such that it only loads authorized iUICCs, that only exactly one iUICC can be loaded, and that a removal of a loaded iUICC can be effected only through an authorized action. In addition, in the security environment there are advantageously stored routines for verifying a loaded iUICC including the subscription data, which are processed during each loading of an iUICC into the memory of the security environment.

Further embodiment examples as well as advantages of the invention will be explained hereinafter with reference to the FIGURE, in the representation of which a rendition that is true to scale and to proportion has been dispensed with in order to increase the clearness.

BRIEF DESCRIPTION OF THE DRAWINGS

There is shown:

FIG. 1 schematically a mobile terminal with a single-chip system for explaining the procedure in a method according to the invention.

DETAILED DESCRIPTION OF VARIOUS EMBODIMENTS

The invention is now explained on the basis of the example of the first-time startup of an iUICC (integrated UICC) in a mobile terminal. For this purpose, FIG. 1 schematically shows a mobile terminal 10 having a single-chip system 20, which has an application processor 22, a baseband processor 24 and a security environment 26. The various components of the single-chip system 20 communicate with one another via a system bus 28.

An iUICC 30 is stored in the memory of the security environment 26, said iUICC 30 containing only a bootloader 32, but as yet no firmware image for the iUICC 30. When the iUICC is started up for the first time, the application processor 22 boots first and starts the baseband processor 24 when the single-chip system 20 is started. Initiated either by the baseband processor 24 or by the application processor 22, the IUICC 30 is then started in the security environment 26 and requested to transmit a status message.

In response, the bootloader 32 of the iUICC 30 transmits a status message to the baseband processor 24 in which it is stated whether the iUICC 30 contains only a bootloader 32, but as yet no firmware image for the iUICC 30 (case S1), whether the iUICC 30 already contains a firmware image, but is not yet fully personalized (case S2), or whether the iUICC 30 is already fully personalized (case S3).

The baseband processor 24 is adapted in this case in such a manner that it accepts the iUICC 30 in the security environment 26 in the cases S1), S2) and S3) and rejects it in other cases. Depending on the received status, the baseband processor 24 can initiate further actions. For example, in the case S1), a download of the firmware image of the IUICC 30 is carried out for the first-time startup. In the case S2), in which the firmware image is already present, a subscription can be carried out with the aid of the application processor 22, and in the case S3) a SIM initialization can be effected.

Even if the baseband processor 24 is not adapted as described above, the bootloader 32 can nevertheless achieve that the iUICC 30 is not rejected by the baseband processor 24 upon the first-time startup. For this purpose, the bootloader 32 of the IUICC 30 is set up such that it executes the commands received from the baseband processor 24, without, however, making fully available the functionality implied in each case. For example, in the startup sequence various files are selected and read out by the baseband processor 24. Instead of making available the file system itself, the bootloader 32 is adapted such that it merely simulates the existence of these files by positively acknowledging corresponding requests.

For example, when a file is read out, the bootloader 32 returns the minimum empty default value that is expected per file. This can be ZERO for a file, or a minimum number of bytes with empty entry, depending on the context, for example FF or 00, or a default value according to the annex E of the specification TS 31.102. An authentication request is acknowledged with a corresponding error message. Commands for writing the files are positively acknowledged vis-à-vis the baseband processor 24, however, upon the re-reading, the default value described above is returned again. Overall, the bootloader 32 responds to the requests from the baseband processor 24 as expected by the latter, and is therefore not rejected as an invalid SIM, so that after starting the iUICC 30 the desired download of the firmware image can be carried out.

The last-described procedure can also be carried out only when the transmission of the first-described status message to the baseband processor 24 has failed. In this case, the bootloader 32 first transmits the above-specified status message S1) in response to the request from the baseband processor 24, with the content that the iUICC 30 contains only a bootloader 32, but as yet no firmware image for the secure element. If the baseband processor 24 is adapted to receive such status messages, the status message and thus the iUICC 30 is accepted and a download for a firmware image is carried out subsequently, as described above.

If the status message S1) is not accepted, the bootloader 32 concludes that the baseband processor 24 of the mobile terminal 10 is not adapted to receive such status messages and, upon a renewed request by the baseband processor 24, chooses the above-described simulation of the ATR of an already fully personalized UICC as an alternative procedure. After successful passing of the startup sequence, the desired download of the firmware image can be carried out also in this case.

In both described cases, the iUICC equipped only with a bootloader 32 remains ready for operation and is therefore available for subscription management services. A turning-off of the secure element by the baseband processor 24 is prevented. In the first-specified case, the baseband processor 24 even knows the status of the iUICC 30 and can therefore start corresponding further actions depending on the status.

The procedure described can also be used in classical UICCs in the SIM card form factor, as well as in embedded UICCs (eUICC), if these platforms support a software image download.

If the hardware platform supports multiple UICC platforms in parallel for the mapping of multiple SIM solutions, all requests are answered in accordance with the procedure described above.

In a further development, it is also possible for the above-described bootloader 32 to contain an initial minimum subscription, which can be used for logging into a mobile communication network, with which, however, only a software image and the associated personalization data can be loaded.

The invention claimed is:

1. A method for a first-time startup of a secure element of a mobile terminal, the secure element serving for a use of services of a mobile communication network by the mobile terminal, the method comprising:
the secure element is started for the first time and requested by the mobile terminal to transmit a status message about a firmware image and/or personalization of the secure element;
the secure element, in response to the request, transmits the status message to the mobile terminal in which it is stated whether the secure element
S1) contains only a bootloader, but as yet the secure element contains no firmware image for the secure element,
S2) contains a firmware image for the secure element, but the secure element is not yet fully personalized, or
S3) is fully personalized;
the secure element is accepted by the mobile terminal in a case that the secure element transmits the status message of S1), S2) or S3), and the secure element is rejected by the mobile terminal in a case that the secure element does not transmit a status message of at least one of S1), S2), and S3); and
in a case that the secure element transmits the status message of S1), a download for a firmware image of the secure element is initiated for the first-time startup,
wherein the mobile terminal includes one or more processors and a security environment in a single-chip system, and the secure element is loaded into the security environment.

2. The method according to claim 1, wherein the secure element is configured as a universal integrated circuit card.

3. The method according to claim 1, wherein the secure element is configured as an integrated UICC.

4. The method according to claim 1, wherein in the case S2) a subscription is carried out with a mobile communication network provider.

5. The method according to claim 1, wherein the secure element is integrated into a single-chip system of the mobile terminal.

6. The method according to claim 1, wherein a processor of the mobile terminal requests the secure element to transmit the status message.

7. The method according to claim 1, wherein a baseband processor of the mobile terminal requests the secure element to transmit the status message.

8. The method according to claim 1, wherein an application processor of the mobile terminal requests the secure element to transmit the status message.

9. The method according to claim 1, wherein the secure element, in response to the request, transmits the status message to a processor of the mobile terminal.

10. The method according to claim 1, wherein the secure element is accepted by a processor of the mobile terminal in the case that the secure element transmits the status message of S1), S2) or S3), and the secure element is rejected by the processor of the mobile terminal in the case that the secure element does not transmit the status message of at least one of S1), S2), and S3).

11. The method according to claim 1, wherein in the case that the secure element transmits the status message of S1), the download for the firmware image of the secure element is initiated by a processor of the mobile terminal for the first-time startup.

12. The method according to claim 1, wherein in the case S3) a SIM initialization is carried out.

13. A method for a first-time startup of a secure element of a mobile terminal, wherein the secure element does not yet contain a firmware image, the secure element serving for a use of services of a mobile communication network by the mobile terminal, the method comprising:
starting the secure element for the first time and requesting in a request by the mobile terminal that the secure element transmit a status message about a firmware image and/or personalization of the secure element and to execute commands;

in response to the request, the secure element transmitting an expected status message to the mobile terminal and positively acknowledging execution of the commands to ensure that the secure element is accepted upon the first-time startup; and initiating by the mobile terminal a download for a firmware image of the secure element for the first-time startup, wherein the mobile terminal includes one or more processors and a security environment in a single-chip system, and the secure element is loaded into the security environment.

14. The method according to claim 13, wherein the secure element is configured as a universal integrated circuit card.

15. The method according to claim 13, wherein the secure element is configured as an integrated UICC.

16. The method according to claim 15, wherein in the case that the secure element transmits the status message of S1), the network binding of the integrated UICC loaded into the security environment of the mobile terminal is ensured by, loading a start UICC into the security environment, the start UICC containing rules for selecting loadable subscription data.

17. The method according to claim 16, wherein the start UICC contains no subscription data and cannot be removed from the security environment in an unauthorized manner.

18. The method according to claim 16, wherein the start UICC is loaded into the security environment via a generic bootloader with which the mobile terminal is initially equipped.

19. The method according to claim 18, wherein the generic bootloader is locked such that the start UICC cannot be removed and no additional UICC can be loaded into the security environment.

20. A method for a first-time startup of a secure element of a mobile terminal, the secure element not yet containing a firmware image, the secure element serving for a use of services of a mobile communication network by the mobile terminal, the method comprising:

starting the secure element for the first time and requesting in a first request by the mobile terminal that the secure element transmit a status message about a firmware image and/or personalization of the secure element;

in response to the request, the secure element transmitting to the mobile terminal a status message in which it is stated that the secure element S1) contains only a bootloader but as yet no firmware image for the secure element; and in a case that the status message is not accepted by the mobile terminal, the secure element transmitting, in response to a renewed request from the mobile terminal, an expected status message and, in response to a request to execute commands from the mobile terminal, the secure element positively acknowledging to the mobile terminal execution of the commands to ensure that the secure element is accepted upon the first-time startup; and initiating by the mobile terminal a download for a firmware image of the secure element for the first-time startup, wherein the mobile terminal includes one or more processors and a security environment in a single-chip system, and the secure element is loaded into the security environment.

* * * * *